United States Patent [19]

Kono

[11] Patent Number: 4,772,947
[45] Date of Patent: Sep. 20, 1988

[54] METHOD AND APPARATUS FOR TRANSMITTING COMPRESSION VIDEO DATA AND DECODING THE SAME FOR RECONSTRUCTING AN IMAGE FROM THE RECEIVED DATA

[75] Inventor: Tetsujiro Kono, Kanagawa, Japan

[73] Assignee: Sony Corporation, Tokyo, Japan

[21] Appl. No.: 942,701

[22] Filed: Dec. 17, 1986

[30] Foreign Application Priority Data

Dec. 18, 1995 [JP] Japan ................................ 60-284998

[51] Int. Cl.[4] .............................................. H04J 7/12
[52] U.S. Cl. .................................... 358/135; 358/133; 375/27; 382/56
[58] Field of Search ................... 358/133, 135; 382/9, 382/56; 375/27

[56] References Cited

U.S. PATENT DOCUMENTS

| | | | |
|---|---|---|---|
| 4,541,012 | 9/1985 | Tescher | 358/133 |
| 4,551,768 | 11/1985 | Tsuchujon et al. | 382/56 |
| 4,567,519 | 11/1986 | Richard | 358/133 |
| 4,691,329 | 9/1987 | Turi et al. | 358/133 |
| 4,704,628 | 11/1987 | Chen et al. | 358/133 |

*Primary Examiner*—James J. Groody
*Assistant Examiner*—John K. Peng
*Attorney, Agent, or Firm*—Alvin Sinderbrand

[57] ABSTRACT

For transmitting video data in a block format having predetermined number of pixels in each block arranged in coordinates of a two-dimensional configuration, each block is provided with at least one function of a predetermined degree having respective coefficients corresponding to respective terms thereof and defining a plane or curved surface. Parameters are obtained as the coefficients of the selected function to give a value for each of the pixels by performing the function of the respective coordinates, and such parameters are transmitted for each block. At the receiving side, the coordinates of the pixels contained in each block are generated, and the values of the pixels are determined for reconstructing a video image therefrom by performing on the coordinates the function which corresponds to the received parameters.

12 Claims, 6 Drawing Sheets

METHOD AND APPARATUS FOR TRANSMITTING COMPRESSION VIDEO DATA AND DECODING THE SAME FOR RECONSTRUCTING AN IMAGE FROM THE RECEIVED DATA

BACKGROUND OF THE INVENTION

1. Field of the Invention

The present invention relates to a method and apparatus whereby video data is compressed prior to being transmitted and a reconstructed image is formed from the received data.

2. Description of the Prior Art

In transmitting video data containing a large amount of information, for example, digital television signals, a highly efficient coding method for compressing the amount of data is known. One such highly efficient coding method is a block coding method in which a television image is divided into two-dimensional areas (hereinafter, referred to as blocks) each composed of a plurality of pixels and the coding process is performed for every block.

In a known block coding method, the average value Av and standard deviation $\sigma$ of a plurality of pixel data (luminance values) in a block are obtained, one bit is assigned to each pixel in the block, the luminance value of $(AV+\sigma)$ is encoded as "1", the luminance value of $(Av-\sigma)$ is encoded as "0", and the average value Av of each block and the coded output of each pixel in such block are transmitted.

According to the foregoing block coding method, the image reconstructed from the received data becomes a set of mosaics corresponding to the size of the blocks, causing block distortion which is generated at the boundary between blocks to become conspicuous. Therefore, in order to obtain a reconstructed image of good quality, the size of the blocks needs to be reduced. However, such reduction of the block size causes the compression ratio to deteriorate.

OBJECTS AND SUMMARY OF THE INVENTION

Therefore, it is an object of the present invention to provide a transmitting method which maintains a high compression ratio and yet can provide a reconstructed image of good quality.

Another object of the invention is to provide a transmitting method in which the identification of parameters and the reconstruction of an image from the received parameters are simplified.

In accordance with an aspect of the present invention, a method for transmitting video data in a block format with a predetermined number of pixels in each block arranged in coordinates of a two-dimensional configuration, comprises the steps of providing each block with one or more of a predetermined degree of functions each having respective coefficients corresponding to respective terms thereof and defining a plane or curved surface; obtaining parameters as said coefficients of one of the functions to give a value of each of the pixels by performing the function of the coordinate of each of the pixels; and transmitting the parameters for each block.

The above, and other objects, features and advantages of the present invention, will become apparent from the following detailed description which is to be read with reference to the accompanying drawings.

DETAILED DESCRIPTION OF THE PREFERRED EMBODIMENTS

Figure 1:
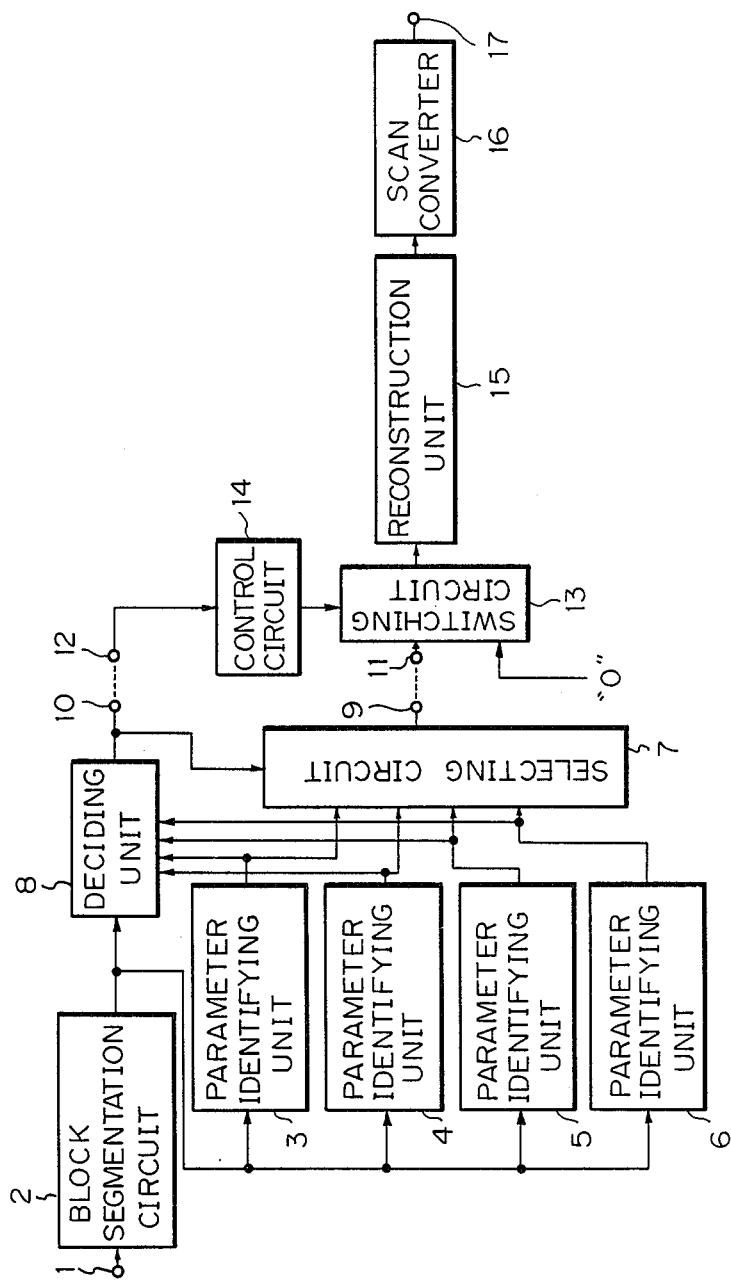
FIG. 1 is a block diagram illustrating a system according to an embodiment of the present invention.
Figure 2:
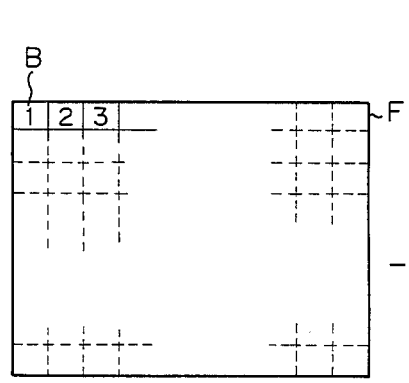
FIG. 2 is a schematic diagram to which reference will be made in explaining a block segmentation process included in the embodiment of FIG. 1.

An embodiment of the present invention will now be described in detail with reference to FIG. 1, in which a digital video signal supplied to an input terminal 1 is transmitted to a block segmentation circuit 2 for converting the order of data from the television scanning order to a predetermined order of blocks. More particularly, in FIG. 2, F denotes a television image of one frame or one field. In such television image F, the pixel data is generated from the left end of each line to the right end thereof. In the vertical direction, the pixel data for successive lines is generated from the top to the bottom of the raster. As indicated in FIG. 2, block segmentation circuit 2 divides the image F into, for example, five parts in each of the vertical and horizontal directions, thereby forming twenty-five blocks B. Data of, for example, eight bits, in particular representing luminance data, is generated by block segmentation circuit 2 for each block in accordance with the order of the numerals written for the respective blocks B. By overlapping the boundaries of adjacent blocks B, the block distortion can be effectively prevented.

Figure 3:
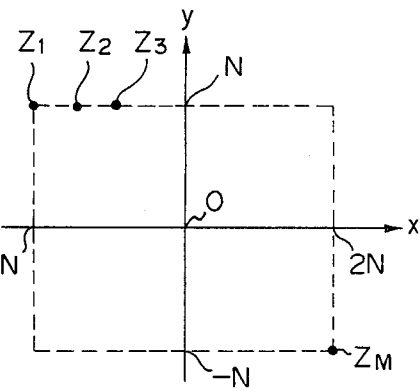
FIG. 3 diagrammatically illustrates a single block.

FIG. 3 shows one of the blocks B. Each block B contains a total of M $\{M=(4N+1)\times(2N+1)\}$ pixels, that is, each block measures $(4N+1)$ pixels in the horizontal direction and $(2N+1)$ pixels in the vertical direction. The position of each pixel in the block B is represented by the coordinates of x and y axes having the center of the block as the origin o.

It is here assumed that the luminance value of the pixel located at the leftmost upper corner in the block B is $Z_1$, that the luminance values of the pixels successively arranged in the horizontal direction from the pixel having the luminance value $Z_1$ are $Z_2, Z_3, \ldots$, and that the luminance value of the pixel data located at the rightmost lower corner of the block B is $Z_M$. The coordinates of the pixel having the luminance value $Z_i$ are expressed as $(x_i, y_i)$.

The output signal of block segmentation circuit 2 is supplied to four parameter identifying units 3, 4, 5 and 6 each using a different degree of plane or curved surface and to a deciding unit 8.

The distribution of all of the luminance values of the pixels contained in one block can be approximately expressed by the coordinates (x,y) shown in FIG. 3. The virtual curved surface which is expressed by those luminance values can be approximated by a special curved surface.

A predicted luminance $\hat{Z}_i$ for the pixel having the coordinates $(x_i, y_i)$ is expressed by $$\hat{Z}_i = a_1 x_i^3 + a_2 x_i^2 y_i + a_3 x_i y_i^2 + a_4 y_i^3 + a_5 x_i^2 \\ + a_6 x_i y_i + a_7 y_i^2 + a_8 x_i + a_9 y_i + a_{10} \quad (1)$$

in the case where it is approximated by a curved surface of degree 3, namely, by a cubic curved surface having two extrema.

In the case of approximating the predicted luminance value $\hat{Z}_i$ by a curved surface of degree 2, that is, by a quadratic curved surface having one extremum, $\hat{Z}_i$ is expressed by $$\hat{Z}_i = a_5 x_i^2 + a_6 x_i y_i + a_7 y_i^2 + a_8 x_i + a_9 y_i + a_{10} \quad (2)$$

In the case of approximating $\hat{Z}_i$ by a curved surface of degree 1, that is, by a flat plane having gradients in the x and y directions, $\hat{Z}_i$ is expressed by $$\hat{Z}_i = a_8 x_i + a_9 y_i + a_{10} \quad (3)$$

In the case of approximating $\hat{Z}_i$ by a curved surface of degree 0, that is, by a flat plane having no gradient, $\hat{Z}_i$ is expressed by $$\hat{Z}_i = a_{10} \quad (4)$$

Where, $a_1$ to $a_{10}$ are parameters.

Each of the parameter identifying units 3 to 6 identifies the parameters $a_1$ to $a_{10}$ so as to obtain the minimum prediction error, for example, the minimum square sum for each true value $Z_i$ ($i=1$ to M) of each predicted value $\hat{Z}_i$ ($i=1$ to M) of expressions (1) to (4).

The parameters identified by parameter identifying units 3 to 6, respectively, are supplied to a selecting circuit 7 and to deciding unit 8. In the example being described, each parameter consists of eight bits.

Deciding unit 8 obtains the distribution of the errors for every block from the errors between the predicted luminance value $\hat{Z}_i$ to be obtained by use of the respective parameters and the luminance value $Z_i$ and generates an additional code to select the parameters which reduce the distribution of the errors and which use a curved surface of a low degree. This additional code consists of two bits.

Selecting circuit 7 performs the following selecting operations in accordance with the additional code from deciding unit 8:

| Additional Code | Selected Parameters |
|---|---|
| (00) → | The parameter $a_{10}$ from parameter identifying unit 6 is selected. |
| (01) → | The parameters $a_8, a_9$ and $a_{10}$ from parameter identifying unit 5 are selected. |
| (10) → | The parameters $a_5, a_6, \ldots, a_{10}$ from parameter identifying unit 4 are selected. |
| (11) → | The parameters $a_1, a_2, a_3, \ldots, a_{10}$ from parameter identifying unit 3 are selected. |

The parameters selected by selecting circuit 7 are supplied therefrom to an output terminal 9. The additional code from deciding unit 8 is supplied to an output terminal 10. These parameters and additional code available at terminals 9 and 10, respectively, are transmitted.

At the reception side, the parameters received at an input terminal 11 are supplied to a switching circuit 13, and the additional code received at an input terminal 12 is supplied to a control circuit 14.

The additional code indicates the degree of the curved surface used to identify the parameters for every block. The control circuit 14 decodes the additional code and generates a control signal for controlling switching circuit 13. The parameters which identify the degree of the curved surface used at the transmission side are output from switching circuit 13. In other words, in the case of the 3-degree curved surface, ten parameters are output from the switching circuit 13. In the cases of the 2-degree, 1-degree and 0-degree curved surfaces, six, three and one parameters, respectively, are output from switching circuit 13. The switching circuit 13 outputs the data "0" in place of the unnecessary parameters.

The parameters from switching circuit 13 are supplied to a reconstructing unit 15 which reconstructs the luminance value from the coordinate data of the block B and the received parameters. The reconstructed data from reconstructing unit 15 is supplied to a scan converter 16 in which the order of the data is returned to the scanning order of the television signal so that data for providing the reconstructed image is derived at an output terminal 17.

The number of curved surfaces used to identify the parameters is not necessarily limited to four, but it is sufficient to use at least two curved surfaces having different degrees.

In this embodiment, M $\{M = (4N+1) \times (2N+1)\}$ data in one block B are compressed to one to ten parameters, so that very substantial data compression can be accomplished. The identification of the parameters $a_1$ to $a_{10}$ by parameter identifying unit 3 will be explained hereinafter.

In the case where the luminance values $Z_1$ to $Z_M$ of M pixels in the block B are predicted by the 3-degree curved surface, they can be expressed by the following matrix operation in which the prediction errors are assumed to be $e_1, e_2, \ldots, e_M$.

$$\begin{bmatrix} Z_1 \\ Z_2 \\ \cdot \\ \cdot \\ \cdot \\ Z_M \end{bmatrix} = \begin{bmatrix} x_1^3 & x_1^2 y_1 & x_1 y_1^2 & y_1^3 & x_1^2 & x_1 y_1 & y_1^2 & x_1 y_1 & 1 \\ x_2^3 & x_2^2 y_2 & x_2 y_2^2 & y_2^3 & x_2^2 & x_2 y_2 & y_2^2 & x_2 y_2 & 1 \\ \cdot & \cdot & \cdot & \cdot & \cdot & \cdot & \cdot & \cdot & \cdot \\ \cdot & \cdot & \cdot & \cdot & \cdot & \cdot & \cdot & \cdot & \cdot \\ \cdot & \cdot & \cdot & \cdot & \cdot & \cdot & \cdot & \cdot & \cdot \\ x_M^3 & x_M^2 y_M & x_M y_M^2 & y_M^3 & x_M^2 & x_M y_M & y_M^2 & x_M y_M & 1 \end{bmatrix} \times$$

-continued $$\begin{bmatrix} a_1 \\ a_2 \\ \cdot \\ \cdot \\ \cdot \\ a_{10} \end{bmatrix} + \begin{bmatrix} e_1 \\ e_2 \\ \cdot \\ \cdot \\ \cdot \\ e_M \end{bmatrix}$$

The operation of the above matrix can be rewritten by the following expression:

$$Z = W \cdot a + e$$

in which Z denotes a vector of M-degree, W is a matrix of (M rows and ten columns), a is a vector of ten degrees, and e is a vector of M-degrees. The parameters a which minimize the square sum of the errors obtained by the method of least squares are expressed by the following expression:

$$a = (W^T W)^{-1} \cdot Z$$

The coordinates $(X_1, X_2, \ldots, X_M, Y_1, Y_2, \ldots, Y_M)$ of each luminance value in the block become the fixed data if the value of N corresponding to the block size is determined. Therefore, the term (coordinate data) of $(W^T W)^{-1} W^T$ becomes the fixed data which is common to all blocks and can be generated by, for example, an ROM.

Since the matrix of $(W^T W)^{-1}$ is the product of {(ten rows, M columns)×(M rows, ten columns)}, it becomes the matrix of (ten rows, ten columns). Since the matrix of $(W^T W)^{-1} W^T$ is the product of {(10 rows, 10 columns)×(10 rows, M columns)}, it becomes the matrix of (10 rows, M columns). Therefore, the expression to obtain the parameters a by the method of least squares becomes as follows.

$$\begin{bmatrix} a_1 \\ a_2 \\ \cdot \\ \cdot \\ a_{10} \end{bmatrix} = \begin{bmatrix} W_1(1) & W_2(1) & \ldots & W_M(1) \\ W_1(2) & W_2(2) & \ldots & W_M(2) \\ \cdot & \cdot & \ldots & \cdot \\ \cdot & \cdot & \ldots & \cdot \\ W_1(10) & W_2(10) & \ldots & W_M(10) \end{bmatrix} \begin{bmatrix} Z_1 \\ Z_2 \\ \cdot \\ \cdot \\ Z_M \end{bmatrix}$$

Figure 4:
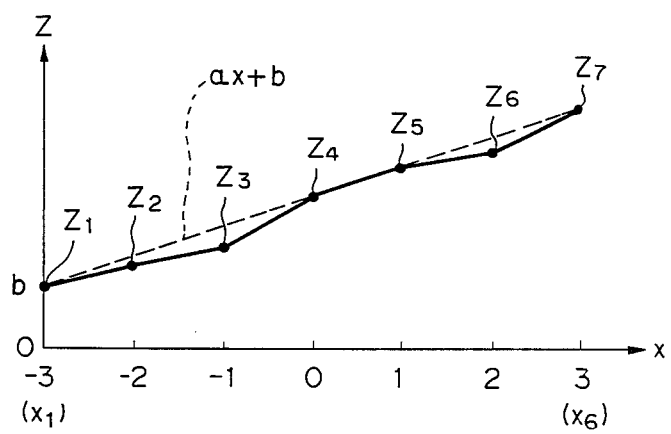
FIG. 4 is a schematic diagram to which reference will be made in explaining fitting according to the invention.

To enable the fitting of the data in a block to be easily understood, an example in which a one-dimensional block is fitted by a straight line will now be described with reference to FIG. 4. One block consists of seven pixels on the same line and, as shown in FIG. 4, the x coordinate is formed with the central pixel having the value $Z_4$ as the origin. If the luminance values $Z_1, Z_2, \ldots, Z_7$ of the respective pixels have changed, as shown in FIG. 4, the luminance values in the block are fitted by the straight line (ax+b) indicated by a broken line. Therefore, the luminance values of the respective pixels are represented by the following expression.

$$\begin{bmatrix} Z_1 \\ Z_2 \\ Z_3 \\ Z_4 \\ Z_5 \\ Z_6 \\ Z_7 \end{bmatrix} = \begin{bmatrix} -3 & 1 \\ -2 & 1 \\ -1 & 1 \\ 0 & 1 \\ 1 & 1 \\ 2 & 1 \\ 3 & 1 \end{bmatrix} \cdot \begin{bmatrix} a \\ b \end{bmatrix} + \begin{bmatrix} e_1 \\ e_2 \\ e_3 \\ e_4 \\ e_5 \\ e_6 \\ e_7 \end{bmatrix}$$

With respect to the above expression, parameters a and b are identified by the method of least squares. In the case of fitting by a quadratic curve ($ax^2 + bx + c$) instead of a straight line, it is necessary to identify three parameters a, b and c. Since the invention is applied to a two-dimensional block, the data in the block is fitted by a curved surface instead of a straight line or curved line.

Figure 5:
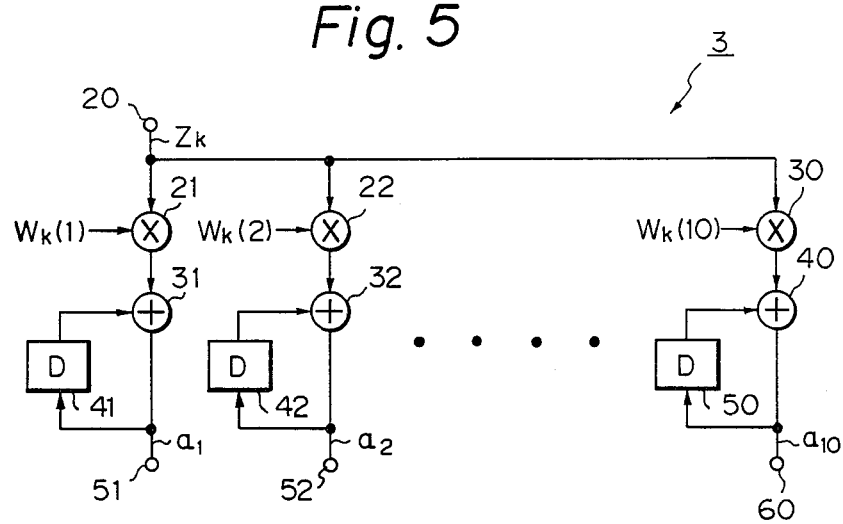
FIGS. 5, 6, 7 and 8 are block diagrams showing practical examples of parameter identifying units that may be used in the system of FIG. 1.

FIG. 5 shows a specific circuit arrangement that may be used as the parameter identifying unit 3. The luminance value $Z_k$ from block segmentation circuit 2 is supplied through an input terminal 20 to ten multipliers 21, 22, ..., 30, respectively. The coordinate data $W_k(1), W_k(2), \ldots, W_k(10)$ of the luminance value $Z_k$ are supplied from a ROM (not shown) to multipliers 21 to 30, respectively.

The output data from multipliers 21 to 30 are supplied to first input terminals of adders 31, 32, ..., 40, respectively. The output data from adders 31 to 40 are supplied to registers 41, 42, ..., 50, respectively, and to output terminals 51, 52, ..., 60, respectively. The outputs of registers 41, 42, ..., 50 are applied to second inputs of adders 31, 32, ..., 40, respectively. An integrating circuit is constituted by each of the adders 31, 32, ..., 40 and the paired register 41, 42, ... 50, respectively. The registers 41 to 50 are reset each time the calculations of M luminance values of one block are finished.

When M luminance values are supplied to input terminal 20, the output data which is obtained at output terminal 51 becomes $\{W_1(1)Z_1 + W_2(1)Z_2 + \ldots + W_M(1)Z_m = a_1\}$ and the parameter $a_1$ is produced. Similarly, the parameters $a_2, a_3, \ldots, a_{10}$ are derived at the output terminals 52, 53, ..., 60, respectively.

Figure 6:
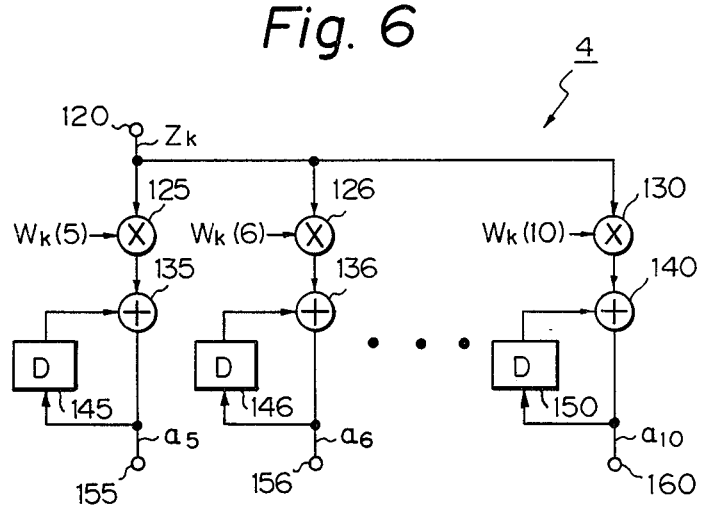

The parameter identifying unit 4 identifies six parameters $a_5, a_6, \ldots, a_{10}$ and may have the circuit arrangement shown in FIG. 6. More particularly, unit 4 is shown to have an arrangement similar to that of parameter identifying unit 3, with the luminance value $Z_k$ being supplied through an input terminal 120 to six multipliers 125, 126, ..., 130 which also receive the coordinate data $W_k(5), W_k(6), \ldots, W_k(10)$. The resulting products are supplied from multipliers 125, 126, ..., 130 to respective integrating circuits constituted by an adder 135 and a register 145, an adder 136 and a register 146, ..., an adder 140 and a register 150, respectively, for providing parameters $a_5, a_6, \ldots a_{10}$ at respective output terminals 155, 156, ... 160.

Figure 7:
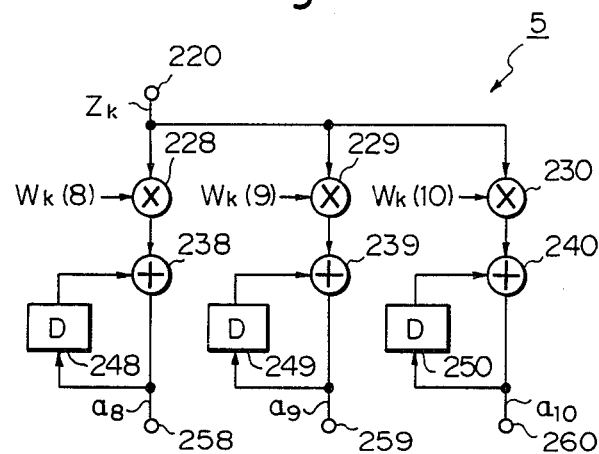

The parameter identifying unit 5 is similarly shown on FIG. 7 for identifying three parameters $a_8, a_9$ and $a_{10}$. More particularly, in FIG. 7, the luminance value $Z_k$ is supplied through an input terminal 220 to three multipliers 228, 229 and 230 which also receive the coordinate data $W_k(8), W_k(9)$ and $W_k(10)$, respectively. The products are supplied from multipliers 228, 229 and 230 to respective integrating circuits constituted by an adder 238 and a register 248, an adder 239 and a register 249, and an adder 240 and a register 250, respectively, for providing the parameters $a_8, a_9$ and $a_{10}$ at respective output terminals 258, 259 and 260.

Figure 8:
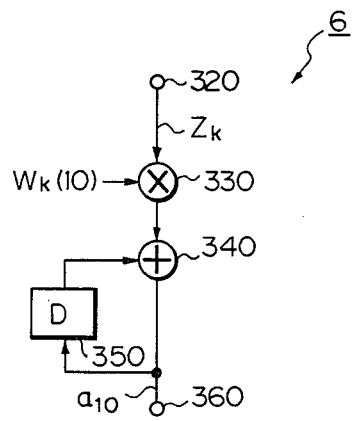

Finally, as shown on FIG. 8, parameter identifying unit 6 for identifying the single parameter $a_{10}$ may comprise an input terminal 320 through which luminance value $Z_k$ is supplied to a multiplier 330 which also receives the coordinate data $W_k(10)$. The product of multiplier 330 is supplied to an integrating circuit constituted by an adder 340 and a register 350 for providing the parameter $a_{10}$ at a respective output terminal 360.

Deciding unit 8 decides the parameters so as to reduce the error distribution ($\sigma$) and further to reduce the degree of the curved surface used to identify the parameters to as low a degree as possible among the parameters identified respectively by the parameter identifying units 3 to 6.

Figure 9:
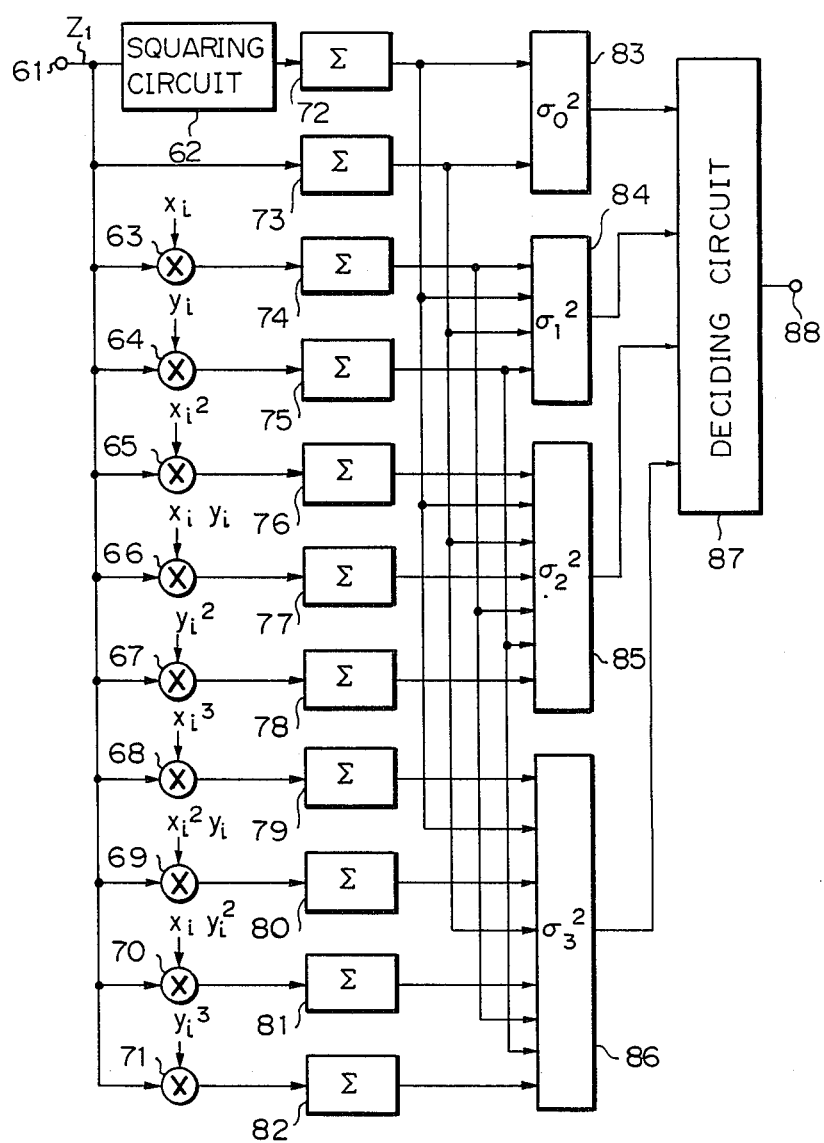
FIG. 9 is a block diagram illustrating a deciding unit included in the embodiment of the invention shown on FIG. 1.

Referring now to FIG. 9, it will be seen that deciding unit 8 may include an input terminal 61 through which the video data from block segmentation circuit 2 is supplied to a squaring circuit 62, an integrating circuit 73, and nine multipliers 63 to 71, respectively. When the ith luminance value $Z_i$ of one block is supplied to input terminal 61, the coordinate data $(x_1, y_i, x_i^2, x_iy_i, y_i^2, x_i^3, x_i^2y_i, x_iy_i^2, y_i^3)$ are supplied to multipliers 63 to 71, respectively.

The output of squaring circuit 62 is supplied to an integrating circuit 72, and the outputs of multipliers 63 to 71 are supplied to integrating circuits 74 to 82, respectively. Each of integrating circuit 72 which is supplied with the output of squaring circuit 62, integrating circuit 73 which is supplied with the luminance value $Z_i$, and integrating circuits 74 to 82 which are supplied with the multiplied outputs of multipliers 63 to 71 performs the M integrating operations (that is, adds the present input and the preceding added output) in correspondence to the number of pixels in one block. The outputs of integrating circuits 72 to 82 are selectively supplied to arithmetic operating circuits 83 to 86 each for obtaining the error distribution.

The operating circuit 83 calculates the error distribution $\sigma_0^2$ when the 0-degree curved surface (that is, a flat plane having no gradients) is used. The operating circuit 84 calculates the error distribution $\sigma_1^2$ when the linear curved surface (that is, a flat plane with gradients) is used. The operating circuit 85 calculates the error distribution $\sigma_2^2$ when the quadratic curved surface is used. The operating circuit 86 calculates the error distribution $\sigma_3^2$ when the cubic curved surface is used. The resultant error distributions $\sigma_0^2$, $\sigma_1^2$, $\sigma_2^2$ and $\sigma_3^2$ are supplied to a deciding circuit 87 which generates a control signal supplied to an output terminal 88 for causing selecting circuit 7 to select the proper parameters in accordance with the error distributions and the degree of the curved surface used for the parameter identification.

More particularly, one of a plurality of parameters is selected in consideration of both of the value of the error distribution and the degree of the curved surface used for fitting. In general, the relation ($\sigma_3^2 < \sigma_2^2 < \sigma_1^2 < \sigma_0^2$) exists among the error distributions. There is also the relation ($r_3 > r_2 > r_1 > r_0$) among the compression ratios r. In the case of an image (block) having a sudden change, the above relation of the magnitudes of the error distributions holds true. In the case of a smooth image (block), a similar relation of the error distributions is obtained, but there are hardly any differences between the magnitudes of the error distributions.

If the error distributions are almost equal, the parameters which are selected are those obtained as the result of the fitting process using the curved surface of a low degree and which can permit the compression ratio r to be raised.

Methods of calculating the error distributions $\sigma_0^2$, $\sigma_1^2$, $\sigma_2^2$ and $\sigma_3^2$ will now be explained. (i) Calculation of $\sigma_0^2$ Assuming that M is the number of pixels in one block, from $(\hat{Z}_i = a_{10})$, the error distribution becomes $$\sigma_0^2 = \frac{1}{M} \Sigma (Z_i - a_{10})^2$$
$$= \frac{1}{M} \Sigma (Z_i)^2 - 2a_{10} \frac{1}{M} \Sigma(Z_i) + a_{10}^2$$

Therefore, when parameter $a_{10}$ is identified, the square sum $(\Sigma(Z_i)^2)$ of the luminance values and the integrated value $(\Sigma(Z_i))$ of the luminance values are calculated by squaring circuit 62 and integrating circuit 72 and by integrating circuit 73, respectively. Through use of the identified parameter $a_{10}$, the error distribution $\sigma_0^2$ is obtained by operating circuit 83 in accordance with the above expression.

Now, when $$\left( \frac{\partial \sigma^2}{\partial a} = 0 \right)$$

is obtained by the method of least squares, $$\left( a_{10} = \frac{1}{M} \Sigma(Z_i) \right)$$

is unconditionally determined. Therefore, the error distribution $\sigma_0^2$ can be calculated as follows without using any parameter.

$$\sigma_0^2 = \frac{1}{M} \Sigma (Z_i)^2 - \left\{ \frac{1}{M} \Sigma(Z_i) \right\}^2$$

(ii) Calculation of $\sigma_1^2$

From $(\hat{Z}_i = a_8 x_i + a_9 y_i + a_{10})$, the error distribution becomes $$\sigma_1^2 = \frac{1}{M} \Sigma (Z_i - a_8 x_i - a_9 y_i - a_{10})^2$$
$$= \frac{1}{M} \Sigma(Z_i^2) + a_{10}^2 + a_8^2 \frac{1}{M} \Sigma(x_i^2) + a_9^2 \frac{1}{M} \Sigma(y_i^2)$$
$$- 2a_{10} \frac{1}{M} \Sigma(Z_i) - 2a_8 \frac{1}{M} \Sigma(x_i Z_i) -$$
$$2a_9 \frac{1}{M} \Sigma(y_i \cdot Z_i)$$
$$+ 2a_{10}a_8 \frac{1}{M} \Sigma(x_i) + 2a_{10}a_9 \frac{1}{M} \Sigma(y_i)$$
$$+ 2a_8 a_9 \frac{1}{M} \Sigma(x_i y_i)$$

In the above expression, there is no need to calculate $\Sigma(x_i^2)$, $\Sigma(y_i^2)$, $\Sigma(x_i y_i)$, $\Sigma(x_i)$, and $\Sigma(y_i)$ because they are the constants which are unconditionally determined from the coordinate data and the number M of pixels. Therefore, the error distribution $\sigma_1^2$ can be obtained by use of the parameters $a_8, a_9$, and $a_{10}$ which were identified as $\Sigma(Z_i^2)$, $\Sigma(Z_i \cdot x_i)$, and $\Sigma(Z_i \cdot y_i)$. As before, the square sum $\Sigma(Z_i^2)$ of the luminance value and the integrated luminance value $\Sigma(Z_i)$ are obtained by squaring circuit 62 and integrating circuit 72, and by integrating circuit 73, respectively. $\Sigma(Z_i \cdot x_i)$ is derived by multiplier 63 and integrating circuit 74 and $\Sigma(Z_i \cdot y_i)$ is obtained by multiplier 64 and integrating circuit 75.

In this case as well, since the parameters $a_8, a_9$, and $a_{10}$ are obtained from $\Sigma(Z_i^2)$, $\Sigma(Z_i)$, $\Sigma(Z_i \cdot x_i)$, and $\Sigma(Z_i \cdot y_i)$, $\sigma_0^2$ is directly obtained by operating circuit 84 from those four integration results.

(iii) Calculation of $\rho_2^2$

In a manner similar to the above, by obtaining $\Sigma(Z_i^2)$, $\Sigma(Z_i)$, $\Sigma(Z_i \cdot x_i)$, $\Sigma(Z_i \cdot y_i)$, $\Sigma(Z_i \cdot x_i^2)$, $\Sigma(Z_i \cdot x_i \cdot y_i)$, and $\Sigma(Z_i \cdot y_i^2)$ from
$(Z_i = a_5 x_i^2 + a_6 x_i y_i + a_7 y_i^2 + a_8 x_i + a_9 x_i + a_{10})$,
the error distribution $\sigma_2^2$ is calculated for use of the 2-degree curved surface. $\Sigma(Z_i^2)$, $\Sigma(Z_i)$, $\Sigma(Z_i \cdot x_i)$ and $\Sigma(Z_i \cdot y_i)$ are obtained as indicated above. $\Sigma(Z_i \cdot x_i^2)$ is obtained by multiplier 65 and integrating circuit 76, $\Sigma(Z_i \cdot x_i \cdot y_i)$ is obtained by multiplier 66 and integrating circuit 77, and $\Sigma(Z_i \cdot y_i^2)$ is obtained by multiplier 67 and integrating circuit 78. Operating circuit 85 calculates error distribution $\sigma_2^2$ from the outputs of the seven integrating circuits 72 to 78. the error distribution $\sigma_3^2$ is calculated for use of the 3-degree curved surface $\Sigma(Z_i^2)$, $\Sigma(Z_i)$, $\Sigma(Z_i \cdot x_i)$, $\Sigma(Z_i \cdot y_i)$, $\Sigma(Z_i \cdot x_i^2)$, $\Sigma(Z_i \cdot x_i \cdot y_i)$, and $\Sigma(Z_i \cdot y_i^2)$ are all obtained as (iv) Calculation of $\sigma_3^2$ In a manner similar to the above, by obtaining $\Sigma(Z_i^2)$, $\Sigma(Z_i)$, $\Sigma(Z_1 \cdot x_i)$, $\Sigma(Z_i \cdot y_i)$, $\Sigma(Z_i \cdot x_i^2)$, $\Sigma(Z_i \cdot x_i \cdot y_i)$, $\Sigma(Z_i \cdot y_i^2)$, $\Sigma(Z_i \cdot x_i^3)$, $\Sigma(Z_i \cdot x_i^2 \cdot y_i)$, $\Sigma(Z_i \cdot x_i \cdot y_i^2)$, and $\Sigma(Z_i \cdot y_3^3)$ from $(Z_i = a_1 x_i^3 + a_2 x_i^2 y_i + a_3 x_i y_i^2 + a_4 y_i^3 + a_5 x_i^2 + a_6 x_i y_i + a_7 y_i^2 + a_8 x_i + a_9 y_i + a_{10})$, described above. $\Sigma(Z_i x_i^3)$ is obtained by multiplier 68 and integrating circuit 79. Similarly, $\Sigma(Z_i \cdot x_i^2 \cdot y_i)$, $\Sigma(Z_i \cdot x_i \cdot y_i^2)$, and $\Sigma(Z_i \cdot y_i^3)$ are obtained by multiplier 69 and integrating circuit 80, multiplier 70 and integrating circuit 81, and multiplier 71 and integrating circuit 82, respectively. The outputs of integrating circuits 72 to 75 and 79 to 82 are supplied to operating circuit 86 which calculates error distribution $3^2$ therefrom.

Figure 10:
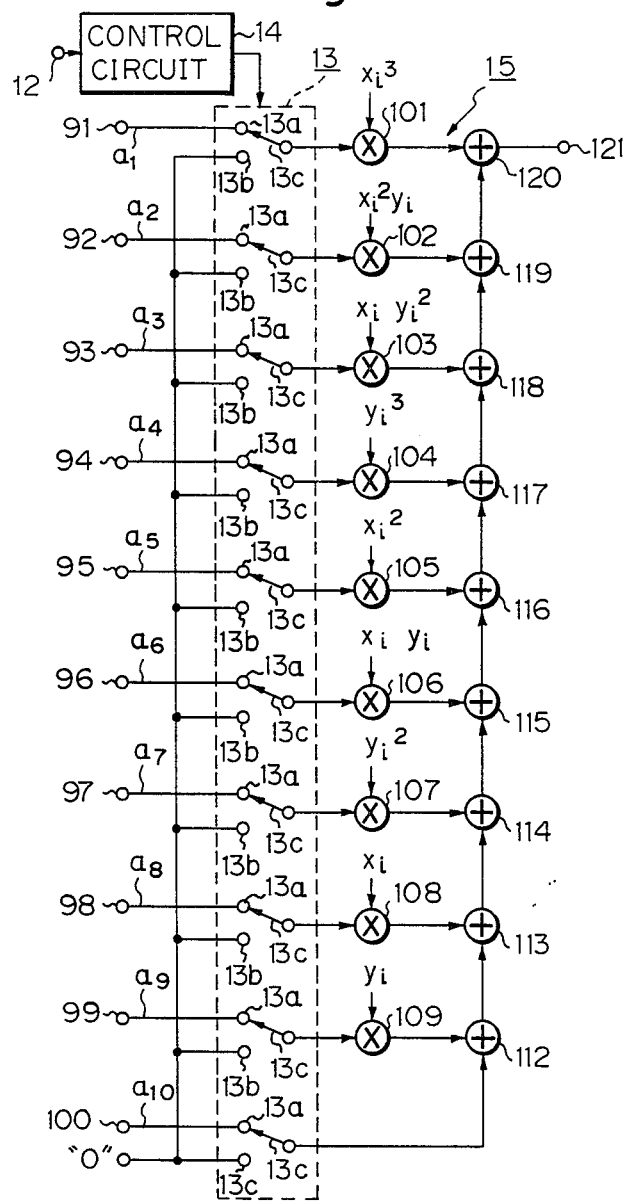
FIG. 10 is a block diagram showing a reconstructing unit included in the embodiment of the invention shown on FIG. 1.

Switching circuit 13 and reconstructing unit 15 at the reception side may be constituted as shown in FIG. 10. The parameters $a_1, a_2, \ldots, a_{10}$ of the one, three, six or ten parameter data received at terminal 11 on FIG. 1 are applied to input terminals 91, 92, . . . , 100, respectively, on FIG. 10. The input terminals 91, 92, . . . , 100 are connected to respective first contacts 13a of switching circuit 13 which are paired with respective second contacts 13b all connected to a source of zero data "0". The first and second contacts 13a and 13b of each pair thereof are alternately engaged by an associated movable contact 13c in accordance with the control signal applied to switching circuit 13 by control circuit 14 in response to the additional code received at terminal 12. More particularly, when the additional code (00) is received at terminal 12, control circuit 14 causes switching circuit 13 to engage a movable contact 13c with the one contact 13a connected to terminal 100 which receives the parameter $a_{10}$, while all of the other movable contacts 13c are made to engage the contacts 13b which receive zero data "0". Similarly, when the additional code (01) is received at terminal 12, switching circuit 13 engages its movable contacts 13c with the respective contacts 13a connected to input terminals 98, 99 and 100 which receive the parameters $a_8, a_9$ and $a_{10}$, respectively, while all of the other movable contacts 13c are engaged with the respective contacts 13b connected with the source of zero data "0". When the additional code (10) is received at terminal 12, switching circuit 13 engages its movable contacts 13c with the respective contacts 13a connected to input terminals 95, 96, 97, 98, 99 and 100 which receive the parameters $a_5, a_6, a_7, a_8, a_9$ and $a_{10}$, respectively, while all of the other movable contacts 13a are engaged the respective contacts 13b connected to the source of zero data "0". Finally, when the additional code (11) is received at terminal 12, all of the movable contacts 13c of switching circuit 13 are engaged with the respective contacts 13a connected with the terminals 91, 92, . . . , 100 which receive the ten parameters $a_1, a_2, \ldots, a_{10}$, respectively.

Reconstructing unit 15 has an ROM (not shown) which generates different coordinate data M times during the period of time in which the received parameters of one block are supplied from switching circuit 13 to reconstructing unit 15, and in which period of time M reconstructed luminance values are sequentially provided at an output terminal 121 for application to scan converter 16.

More particularly, reconstructing unit 15 is shown to include multipliers 101, 102, . . . , 109 connected to the movable contacts 13c of switching circuit 13 associated with the first contacts 13a which are connected with input terminals 91, 92, . . . , 100 receiving parameters $a_1, a_2, \ldots, a_{10}$, respectively. The coordinate data $(x_i^3, x_i^2 y_i, x_i y_i^2, y_i^3, x_i^2, x_i y_i, y_i^2, x_i$ and $y_i$ of the ith pixel are supplied by the previously mentioned ROM to multipliers 101, 102, . . . , 109, respectively. The outputs of multipliers 101, 102, . . . , 109 and of the movable contact 13c associated with the contact 13a connected to input terminal 100 are added by adders 112, 113, . . . , 120, so that a reconstructed luminance value $Z_i$ is obtained at the output terminal 121 which is led out from adder 120 of the final stage.

For example, in the case of approximating by the 3-degree curved surface, the reconstructed luminance value $\hat{Z}_i$ represented by the following expression is obtained:

$$\hat{Z}_i = a_1 x_i + a_2 x_i^2 y_i + a_3 x_i y_i^2 + a_4 y_i^3 +$$

$$a_5 x_i^2 + a_6 x_i y_i + a_7 y_i^2 + a_8 x_i + a_9 y_i + a_{10}$$

Experimentally obtained examples of the standard deviation of the reconstructed errors when the size of one block is changed are shown in the following Table (in the case of approximating by the 3-degree curved surface).

| N | 2 | 3 | 4 | 5 |
|---|---|---|---|---|
| Compression ratio | 1/4.5 | 1/9.1 | 1/15.3 | 1/23.1 |
| Standard deviation | 1.9 | 2.6 | 3.6 | 4.7 |
| N | 6 | | 10 | 20 |
| Compression ratio | 1/32.5 | | 1/86.1 | 1/323.1 |
| Standard deviation | 5.5 | | 8.9 | 10.4 |

The present invention is not limited to a system in which the degree of the n-degree curved surface is selected, as described above with reference to selecting circuit 7 and deciding unit 8, but may be also applied to the case where it is possible to approximate by only a surface curved to a specific degree. In such case, selecting circuit 7 and deciding unit 8 may be omitted.

As mentioned above, according to the invention, an approximation is performed for each block by a curved surface of one or a plurality of degrees. Therefore, even in the case of a 3-degree curved surface it is sufficient to transmit only a maximum of ten parameters $a_1$ to $a_{10}$, so that, if the number of pixels in one block is M, the compression ratio of (10/M) can be realized. In the case of using a 2-degree curved surface, the compression ratio of (6/M) can be realized. Although the compression ratios differ from image-to-image, on the average, the compression ratios can be significantly raised as compared with those obtained when using only the 3-degree curved surface. Moreover, since the luminance values are expressed by various curved surfaces, the picture quality can be remarkably improved as compared with the conventional binary block coding process.

Further, according to the invention, the coordinate data used for identifying the parameters is unchanged from block-to-block so that it may be generated by a ROM. Therefore, the parameter identifying units can be readily constituted by multiplying, adding and register elements, as on FIGS. 5-8.

Although a preferred embodiment of the invention has been described in detail herein with reference to the accompanying drawings, it is to be understood that the invention is not limited to that precise embodiment, and that various changes and modifications may be effected therein by a person skilled in the art without departing from the spirit and scope of the invention as defined in the appended claims.

What is claimed is:

1. A method of transmitting video data in a block format having a predetermined number of pixels arranged in coordinates of a two-dimensional configuration, comprising the steps of:
   providing each block with at least one of a plurality of functions each being of a predetermined degree and each having respective coefficients corresponding to respective terms thereof and defining a respective surface corresponding to pixel values;
   obtaining parameters as said coefficients of one of said functions to give a value of each of said pixels in the respective block by performing said one function of the coordinates of each of said pixels; and
   transmitting said parameters for each said block.

2. A method according to claim 1; wherein said functions define plane and curved surfaces, respectively.

3. A method according to claim 2; wherein only said one of said functions is selected so as to obtain optimal parameters; and said step of transmitting includes transmitting another parameter representative of said selected on of said functions.

4. A method according to claim 1; wherein said step of obtaining parameters includes obtaining said coefficients which make minimum the square sum of predicted errors between predicted values of said pixels derived by calculating said function of the coordinates of said pixels and the true values of said pixels.

5. A method of decoding video data in a block format having a predetermined number of pixels arranged in coordinates of a two-dimensional configuration, and which is transmitted according to claim 1; comprising the steps of: receiving said parameters for each block as respective coefficients corresponding to respective terms of at least one of said plurality of functions of predetermined degree defining said respective surface; generating the coordinates of each pixel; and obtaining the value of each of said pixels by performing said function of the respective coordinates.

6. A method according to claim 5; wherein said receiving step includes receiving another parameter representative of a selected one of said functions which corresponds to optimal parameters, and said obtaining step includes selecting only said one of said functions according to said other parameter for said performing of the function of said coordinates of each of said pixels.

7. An apparatus for transmitting video data in a block format in which a predetermined number of pixels are arranged in coordinates of a two-dimensional configuration, comprising:
   means for providing each block with at least one of a plurality of functions each being of a predetermined degree and each having respective coefficients corresponding to respective terms thereof and defining a respective surface corresponding to pixel values;
   means for obtaining parameters as said coefficients of one of said functions to give a value of each of said pixels in the respected block by performing said one function of the coordinates of each of said pixels; and
   means for transmitting said parameters for each said block.

8. An apparatus according to claim 7; wherein said functions define plane and curved surfaces, respectively.

9. An apparatus according to claim 8; wherein said means for providing includes means for selecting one of said functions so as to obtain optimal parameters, and said transmitting means transmits another parameter representative of said selected one of said functions.

10. An apparatus according to claim 7; wherein said means for obtaining parameters includes means for obtaining said coefficients which make minimum the square sum of predicted errors between predicted values of said pixels derived by calculating said function of the coordinates of said pixels and the true values of said pixels.

11. An apparatus for decoding video data in a block format having a predetermined number of pixels arranged in coordinates of a two-dimensional configuration, comprising:
   means for receiving parameters for each block representing respective coefficients corresponding to respective terms of at least one of a plurality of functions which are each of a predetermined degree and which each define a respective surface approximating values of said pixels of the respective block;
   means for providing the coordinates of each of said pixels; and
   means for obtaining the value of each of said pixels by performing said function of the respective coordinates.

12. An apparatus according to claim 11; wherein said receiving means includes means for receiving another parameter representative of a selected one of said functions, and said means for obtaining includes means for selecting one of said functions according to said other parameters.

* * * * *

REEXAMINATION CERTIFICATE (1068th)

United States Patent [19]

Kono

[11] B1 4,772,947
[45] Certificate Issued May 30, 1989

[54] METHOD AND APPARATUS FOR TRANSMITTING COMPRESSION VIDEO DATA AND DECODING THE SAME FOR RECONSTRUCTING AN IMAGE FROM THE RECEIVED DATA

[75] Inventor: Tetsujiro Kono, Kanagawa, Japan

[73] Assignee: Sony Corporation, Tokyo, Japan

Reexamination Request:
No. 90/001,678, Dec. 23, 1988

Reexamination Certificate for:
Patent No.: 4,772,947
Issued: Sep. 20, 1988
Appl. No.: 942,701
Filed: Dec. 17, 1986

[30] Foreign Application Priority Data

Dec. 18, 1995 [JP] Japan .......................... 60-284998

[51] Int. Cl.⁴ .............................................. H04N 7/12
[52] U.S. Cl. ................................. 358/135; 358/133; 375/27; 382/56
[58] Field of Search ................. 358/133, 135; 382/9, 382/56; 375/27

[56] References Cited

PUBLICATIONS

J. M. Schumpert et al., "A Two-Component Image Coding Scheme Based on Two-Dimensional Interpolation and the Discrete Cosine Transform", ICASSP '83, IEEE International Conference on Acoustics, Speech and Signal Processing, Apr. 14–16, 1983, Boston, Mass., vol. 3, pp. 1232–1235.

*Primary Examiner*—James J. Groody
*Assistant Examiner*—John Peng

[57] ABSTRACT

For transmitting video data in a block format having predetermined number of pixels in each block arranged in coordinates of a two-dimensional configuration, each block is provided with at least one function of a predetermined degree having respective coefficients corresponding to respective terms thereof and defining a plane or curved surface. Parameters are obtained as the coefficients of the selected function to give a value for each of the pixels by performing the function of the respective coordinates, and such parameters are transmitted for each block. At the receiving side, the coordinates of the pixels contained in each block are generated, and the values of the pixels are determined for reconstructing a video image therefrom by performing on the coordinates the function which corresponds to the received parameters.

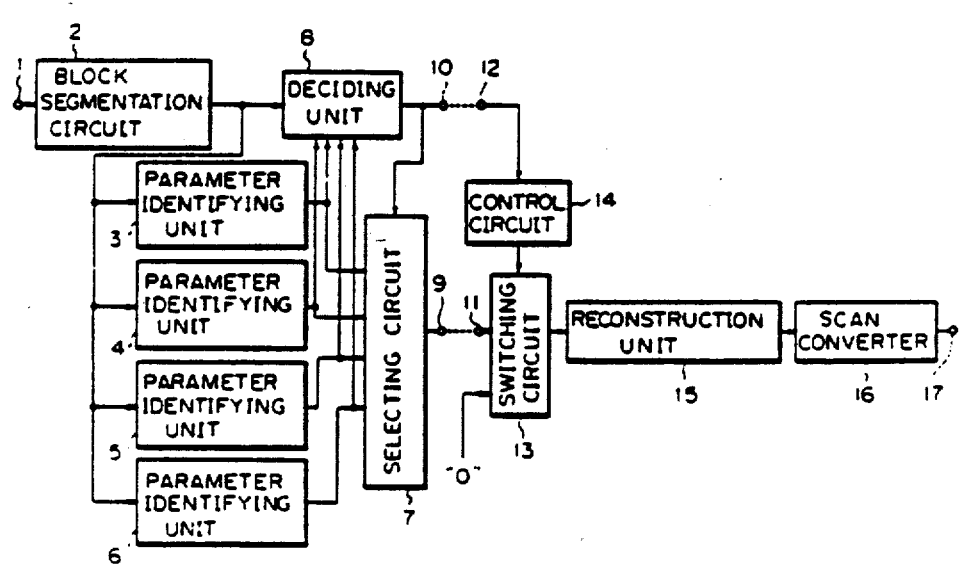

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3, 5–7, 9, 11 and 12 are determined to be patentable as amended.

Claims 2, 4, 8 and 10, dependent on an amended claim, are determined to be patentable.

New claims 13 and 14 are added and determined to be patentable.

1. A method of transmitting video data in a block format having a predetermined number of pixels arranged in coordinates of a two-dimensional configuration, comprising the steps of:
   providing each block with [at least one of] a plurality of functions each being of a predetermined degree and each having respective coefficients corresponding to respective terms thereof and defining a respective surface corresponding to pixel values;
   obtaining parameters as said coefficients [of one] of said functions to give a value of each of said pixels in the respective block by performing [said one] the respective function of the coordinates of each of said pixels; [and]
   selecting one of said functions so as to obtain at least one optimal parameter; and
   transmitting each said optimal parameter [parameters] for each said block.

3. A method according to claim 2; wherein [only said one of said functions is selected so as to obtain optimal parameters; and] said step of transmitting includes transmitting another parameter representative of said selected [on] one of said functions.

5. A method of decoding video data in a block format having a predetermined number of pixels arranged in coordinates of a two-dimensional configuration, and which is transmitted according to claim 1; comprising the steps of: receiving each said optimal parameter [parameters] for each block as respective coefficients corresponding to respective terms of [at least] said selected one of said plurality of functions of predetermined degree defining said respective surface; generating the coordinates of each pixel; and obtaining the value of each of said pixels by selecting only said one of said functions for performing said one function of the respective coordinates.

6. A method according to claim 5; wherein said receiving step includes receiving another parameter representative of [a] said selected one of said functions which corresponds to optimal parameters, and said obtaining step includes selecting only said one of said functions according to said other parameter for said performing of the function of said coordinates of each of said pixels.

7. An apparatus for transmitting video data in a block format in which a predetermined number of pixels are arranged in coordinates of a two-dimensional configuration, comprising:
   means for providing each block with [at least one of] a plurality of functions each being of a predetermined degree and each having respective coefficients corresponding to respective terms thereof and defining a respective surface corresponding to pixel values;
   means for obtaining parameters as said coefficients of [one, of] said functions to give a value of each of said pixels in the respective [respected] block by performing [said one] the respective function of the coordinates of each of said pixels; [and]
   means for selecting one of said functions so as to obtain at least one optimal parameter; and
   means for transmitting each said optimal parameter [parameters] for each said block.

9. An apparatus according to claim 8; wherein [said means for providing includes means for selecting one of said functions so as to obtain optimal parameters, and] said transmitting means transmits another parameter representative of said selected one of said functions.

11. An apparatus for decoding video data in a block format having a predetermined number of pixels arranged in coordinates of a two-dimensional configuration, comprising:
   means for receiving at least one optimal parameter [parameters] for each block representing respective coefficients corresponding to respective terms of [at least] a selected one of a plurality of functions which are each of a predetermined degree and which each define a respective surface approximating values of said pixels of the respective block;
   means for selecting said one of said functions;
   means for providing the coordinates of each of said pixels; and
   means for obtaining the value of each of said pixels by performing said one function of the respective coordinates.

12. An apparatus according to claim 11; wherein said receiving means includes means for receiving another parameter representative of [a] said selected one of said functions, and said means for [obtaining includes means for] selecting selects said one of said functions according to said other [parameters] parameter.

13. A method according to claim 1; wherein said step of obtaining parameters includes obtaining said coefficients which make minimum predicted errors between predicted values of said pixels derived by calculating said function of the coordinates of said pixels and the true values of said pixels; and said step of selecting said one of said functions includes determining said one of said functions according to the minimum predicted errors and said degree of each of said functions.

14. An apparatus according to claim 7; wherein said means for obtaining parameters includes means for obtaining said coefficients which make minimum predicted errors between predicted values of said pixels derived by calculating said function of the coordinates of said pixels and the true values of said pixels; and said means for selecting said one of said functions determines said one of said functions according to the minimum predicted errors and said degree of each of said functions.

* * * * *